United States Patent [19]

Rickard

[11] 4,369,479
[45] Jan. 18, 1983

[54] SAFETY POWER CUTOFF FOR APPLIANCES

[75] Inventor: Jimmy R. Rickard, Louisville, Ky.

[73] Assignee: General Electric Company, Louisville, Ky.

[21] Appl. No.: 110,266

[22] Filed: Jan. 7, 1980

[51] Int. Cl.³ .......................... H01H 9/00; H02H 9/00
[52] U.S. Cl. ........................................ 361/1; 174/68.5;
    200/5 A; 200/61.08; 361/54; 361/397
[58] Field of Search .................. 361/1, 54, 53, 56, 57,
    361/103, 115, 397, 398, 400, 409, 410; 200/5 A,
    292, 61.08; 34/45, 55; 174/68.5; 340/597, 590,
    638, 652

[56] References Cited

U.S. PATENT DOCUMENTS

| | | | |
|---|---|---|---|
| 3,524,920 | 8/1970 | Stromquist et al. | 174/68.5 |
| 3,727,105 | 4/1973 | Hochheiser | 361/55 |
| 3,864,844 | 2/1975 | Heidtmann | 34/45 |
| 3,876,862 | 4/1975 | Newman | 361/1 X |
| 3,890,719 | 6/1975 | Bray et al. | 34/55 |
| 3,898,370 | 8/1975 | Davy et al. | 361/409 X |
| 3,911,325 | 10/1975 | Plasko | 361/103 |
| 3,936,702 | 2/1976 | Plasko | 361/104 |
| 3,942,265 | 3/1976 | Sisler | 34/45 |
| 4,145,584 | 3/1979 | Otterlei | 200/292 X |

Primary Examiner—James R. Scott
Attorney, Agent, or Firm—Radford M. Reams

[57] ABSTRACT

A safety power cutoff arrangement is disclosed for appliances which utilize membrane panel switches on their control panels causing electrical power to the appliance to be shut off in the event of damage to the control panel. The safety cutoff arrangement comprises a conductive track pattern formed over the outermost circuit sheet forming the membrane switch and interrupter circuitry which requires the continuity of the conductive track pattern to be maintained for electrical power to be continued to be supplied to the appliance circuitry. In the event of damage to the control panel, breaking of any segment of the conductive track pattern results in the interrupt safety circuit cutting off power to the appliance.

8 Claims, 4 Drawing Figures

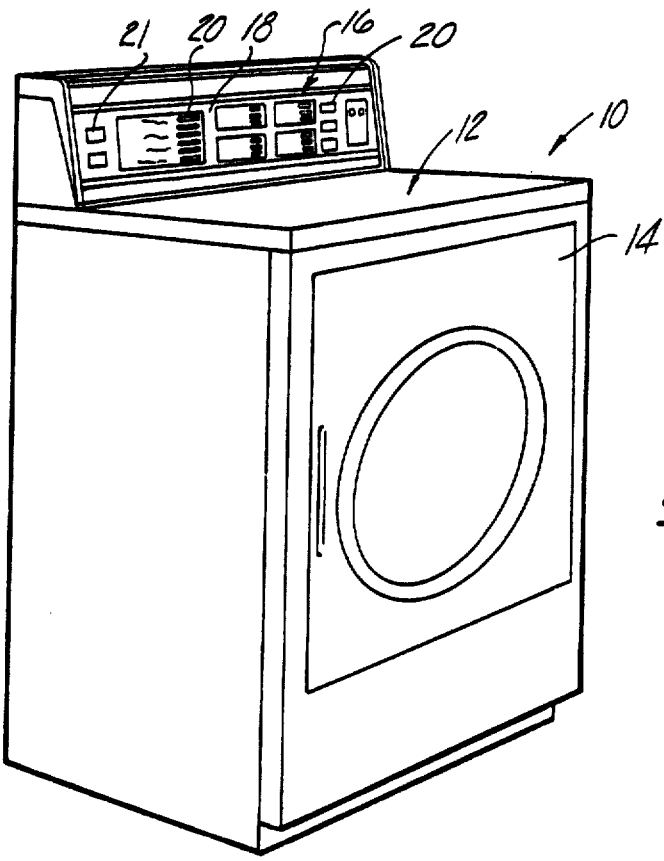
Fig-1
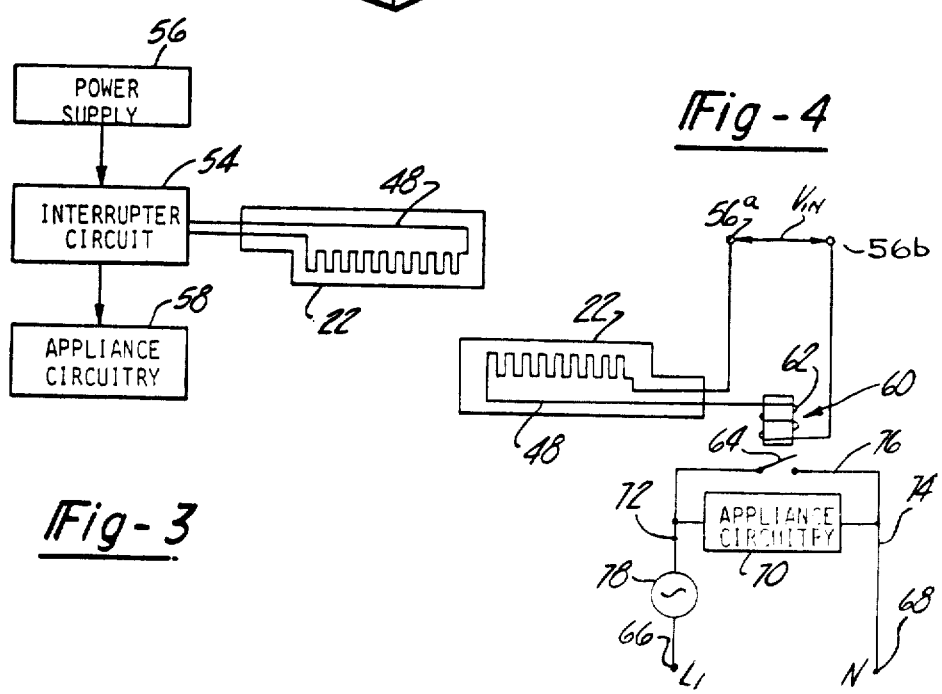
Fig-4
Fig-3

SAFETY POWER CUTOFF FOR APPLIANCES

BACKGROUND DISCUSSION

This invention concerns safety arrangements for appliances and more particularly safety arrangements which insure that the line voltage to the appliance circuitry is caused to be disapplied in the event of significant damage to the control panel. That is, such damage as occurs due to fire or impacts with the control panel.

In recent years, the use of so-called membrane switches for the operator control inputs to the appliance control circuitry have been employed. Such membrane switches present a relatively smooth uninterrupted surface for the control panel and are conveniently manipulated by the appliance operator.

Such appliance membrane switches consist of a pair of circuit bearing sheets of thin material such as polyester film upon which is deposited conductor tracks on the opposing faces of the circuit layers. In addition, certain areas bear a solid conductor material which corresponds to the switching location arranged in an array at corresponding locations on either circuit layer.

Interposed between the circuit layer is an insulator shield having cutouts in the same corresponding locations.

A graphic electrostatic shield bearing the appropriate legends overlays the topmost circuit layer. By pressing the outer conductive areas, the operator causes the corresponding conductive areas in the lower circuit layer to be contacted and a circuit established. According to the nature of the control circuitry, this causes various functions or selections in the control cycles to be made. For example, in the case of a dryer, high and low heat settings, fabric types, etc., in a manner well known in the art.

In the event of damage to the appliance such as caused by fire, it may be advantageous to cause the line voltage applied to the appliance to be discontinued in order to reduce shock and fire hazards which may be present due to the damage to the machine, particularly to the more vulnerable areas such as the membrane switch region of the control panel.

Accordingly, it is an object of the present invention to provide an appliance safety arrangement which causes the power supply to the appliance to be interrupted in the event of physical damage to the control panel of an appliance such as a clothes dryer.

It is a further object of the present invention to provide such a safety arrangement for an appliance incorporating a membrane type switch which particularly responds to damage absorbed by such membrane switch to discontinue application of line voltage to the appliance circuitry.

SUMMARY OF THE INVENTION

These and other objects of the present invention, which will become apparent upon a reading of the following specification and claims, are achieved by the provision on the outermost circuit layer of the membrane switch of a conductive track pattern which pattern forms a series circuit loop, which circuit loop forms a frangible interrupter circuit. This circuit controls the application of line voltage to the appliance circuitry so that upon the development of a discontinuity in the conductive track pattern, as will occur with physical damage to the membrane switch, a power shutoff to the appliance is effected to reduce the resultant hazards which could occur due to such damage to the appliance control panel.

The conductive track pattern is formed on the topmost or outermost circuit layer in the membrane switch to maximize the probability of such continuity interruption in the event of such damage.

DESCRIPTION OF THE DRAWINGS

FIG. 1 is a perspective view of a clothes dryer incorporating a membrane switch mounted on the control panel.

FIG. 3 is a block diagrammatic representation of a safety protection arrangement according to the present invention.

FIG. 4 is a circuit diagram of a representative safety interrupter circuit.

DETAILED DESCRIPTION

Figure 2:
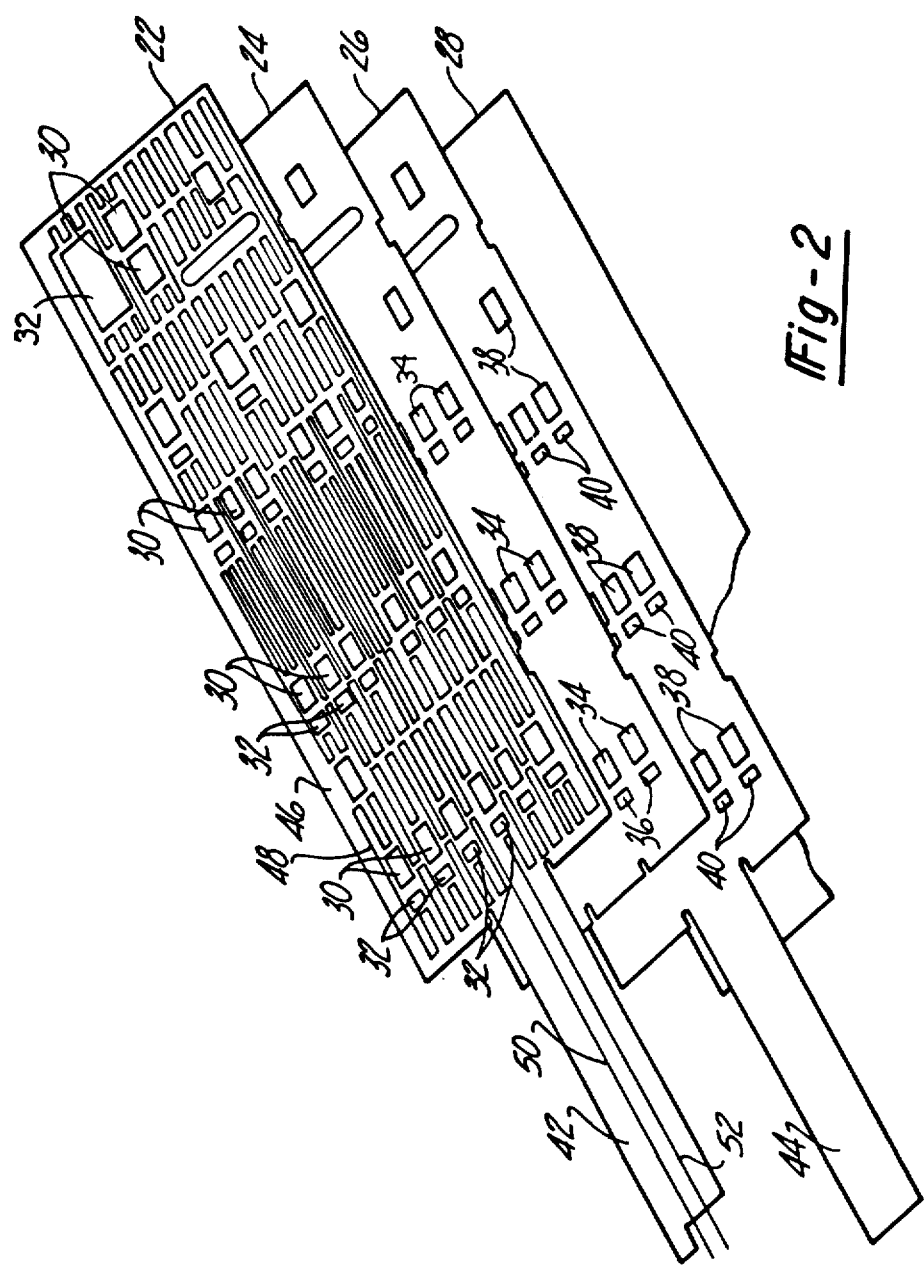
FIG. 2 is an exploded perspective view of the major components of the membrane switch illustrating the conductive pattern forming a part of the present invention on the outer of the circuit layers.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings, particularly FIG. 1, the safety power interrupter arrangement according to the present invention will be described in conjunction with the use of a clothes dryer 10 of a typical construction, with a cabinet housing 12, a rotatable drum (not shown) and other functional components into which clothing items may be placed through a frontal access door 14. A control panel 16 is provided having a front face 18 on which is visible an array of switching areas 20 which are pressure sensitive such that an operator may set in various cycle parameters and can control the cycling of the machine, i.e., such as to set in the heat levels, etc.

The switching function is carried out by means of a touch panel array of switches preferably of the so-called membrane switch type which consists basically of the components depicted in FIG. 2. This includes a top circuit layer 22, an intermediate insulator layer 24, a bottom circuit layer 26, and an adhesive layer 28, also provided with release paper for assembly of the membrane switch to the remaining switch hardware (not shown).

Each of the top circuit layer 22, intermediate insulator layer 24 and bottom circuit layer 26 may be comprised of a suitable dielectric film such as a polyester film on the order of 0.005 inch thickness.

The top circuit layer 22 is assembled to be immediately adjacent the front face 18 of the dryer control panel 16 with a graphic overlay provided with the various indicia corresponding to the switching areas 20. The top circuit layer 22 is provided with conductive switch contacts 30 which are in corresponding locations to the switching areas 20 on the front face 18.

Also provided are cutouts 32 in order to provide transmission of light developed by lamps which corresponds to the various switch states, i.e., when the switch is activated, lamps are provided which are illuminated upon activation of the switch in a manner well known in the art.

The intermediate insulator layer 24 is provided with cutouts 34 corresponding to each of the conductive switch contacts 30 in the top layer 22 and also is provided with cutouts 36 corresponding to the cutouts 32 in the top circuit layer 22.

The bottom circuit layer 26 is provided with conductive switch contacts 38 in corresponding locations to the conductive switch contacts 30 in the top circuit layer 22 of and the switch cutouts 34 on the intermediate insulator layer 24, and also similarly is provided with window cutouts 40.

The switch conductor circuitry (not shown) is associated with the undersurface of top circuit layer 22 and the top surface of the bottom circuit layer 26 as viewed in FIG. 2. This is associated with the various conductive switch contacts 30 and 38 such as to provide various switching combinations which are read out on pin conductive tracks (not shown) on the corresponding surfaces of the projecting portions 42 and 44 of the top circuit layer 22 and bottom circuit layer 26 in a manner well known in the art.

Such switching results in various control functions being activated by means of solid state circuitry of the type well known in the art. Since all of the details do not comprise part of the present invention, a description hereof is not disclosed.

The switching function is basically achieved by pressure on the switching regions 20 causing the conductive switch contacts 30 and 38 to be brought into electrical contact by a slight distension of the conductive switch contact 30 of the top circuit layer 22 through the contact switch cutouts 34 of the insulator and into contact with the conductive switch contact 38 on the bottom circuit layer 26.

According to the concept of the present invention, one of the layers, shown here as the top circuit layer 22, is provided on its upper or outermost surface 46 with a serpentine conductive track pattern 48 consisting of a thin conductive strip, which serpentine pattern forms a series circuit between input and output conductors or tracks 50 and 52, respectively, contained on the projecting portion 42 of the top circuit layer 22.

The serpentine conductive track pattern 48 is such as to substantially cover the entire upper surface of the top circuit layer 22 and is readily frangible so that significant physical damage to the top circuit layer 22 on any area thereof will result in disruption or discontinuity being developed in the serpentine conductive track pattern 48 so as to open the series circuit between input and output tracks 50 and 52.

If an electrostatic shield is empolyed, overlaying the top circuit layer 22, an insulating layer must be interposed to maintain isolation of the loops in the track pattern 48.

The series circuit is operatively coupled to an interrupter circuit 54 as indicated in FIG. 3. Interrupter circuit 54 includes means for interrupting the supply of power from the external power supply 56 to the appliance operating circuitry 58 upon the development of an electrical discontinuity in conductive track pattern 48 such as may be caused by physical damage to the control panel 16.

Such an interrupter circuit could be provided by many methods known to those skilled in the art, as by the use of relays, etc.

A typical such arrangement is shown in diagrammatic form in FIG. 4 and includes the application of input voltage, either AC or DC, as per the particular design requirements, across the terminals 66a and 55b which is thereby applied across the serpentine conductive track pattern 48 and relay hold-in coil 62 of relay 60. Relay 60 is a normally closed relay having switching contacts 64 which are open when relay hold-in coil 62 is energized and closed when coil 62 is de-energized. Contacts 64 are arranged to shunt operating circuitry 70 through shunt line 76 when closed. Relay 60 is placed in series with the serpentine conductive track pattern 48, in such a manner that the hold-in coil 62 is energized through the serpentine conductive track pattern 48 as long as track pattern 48 remains intact. The line voltage from the external power supply is applied across terminals 66 and 68 and is normally applied to the appliance circuitry 70 via lines 72 and 74. A high amperage fuse 78 is placed in line 72 for serially connecting the external power supply to the appliance circuitry 70 and relay contacts 64. Fuse 78 is operative to interrupt the flow of current therethrough when the current level exceeds its predetermined rated limit. If the switching contact 64 closes due to interruption of the serpentine conductive track pattern 48, then line or power supply voltage applied across terminals L1 and N is shorted through shunt line 76 causing the current through fuse 78 to exceed its rated limit, whereupon fuse 78 prevents further current flow to the appliance circuitry thereby effectively disconnecting the operating circuitry from the power supply.

It will be appreciated by those skilled in the art that this arrangement is generally referred to as a "crowbar" circuit, and this results in the disapplication of line voltage to the appliance circuitry 70.

Accordingly, it can be seen that this arrangement provides a highly reliable method of shutting off power to the appliance in the eventualities noted to thereby reduce the hazards associated with the application of line voltage to the appliance circuitry in this situation.

At the same time, it can be appreciated that the arrangement can be provided at very modest cost such as to not add substantially to the manufacturing costs of appliances incorporating this feature.

I claim:

1. A power interrupter arrangement for an appliance of they type having a control panel and operating circuitry energized by an external power supply, said arrangement comprising:
   frangible circuit means adapted for mounting to the control panel; and
   interrupt means operatively coupled to said frangible circuit means effective to interrupt energization of the operating circuitry by the external power supply upon breaking of said frangible circuit means.

2. The power interrupter arrangement of claim 1 wherein said frangible circuit means comprises a membrane layer adapted for mounting to the control panel and a serpentine conductive track pattern substantially covering at least one surface of said membrane layer; and wherein said interrupt means is effective to interrupt energization of the operating circuitry by the external power supply upon the development of a discontinuity in said conductive track pattern.

3. The power interrupter arrangement of claim 2 further comprising a touch panel array of switches for mounting to the control panel, said touch panel array comprising a plurality of layers and wherein said membrane layer comprises one of said plurality of layers.

4. A power interrupter arrangement for an appliance having a control panel and operating circuitry energized by an external power supply said arrangement comprising:
- a touch panel array of switches adapted for mounting to the control panel, said array comprising a plurality of touch panel layers including an outer layer;
- a conductive track pattern extending substantially over at least one of said plurality of layers, said pattern including input and output conductors and forming a series circuit between said input and output conductors; and
- interrupt circuit means operatively coupled to said conductive track pattern comprising means for interrupting power from the external power supply to the operating circuitry upon the development of an electrical discontinuity in said conductive track pattern;
whereby physical damage to the control panel causing an electrical discontinuity in said track pattern results in the removal of power from the operating circuitry of the appliance.

5. The power interrupter arrangement of claim 4 wherein said interrupt circuit means comprises relay means energized through said conductive track pattern and means responsive to said relay means, operative to disconnect the operating circuitry from the power supply upon the development of an electrical discontinuity in said conductive track pattern which interrupts energization of said relay means.

6. The power interrupter arrangement of claim 5 wherein said relay means includes contacts which are open when said relay means is energized and closed when said relay means is de-energized, said contacts being arranged to shunt the operating circuitry when closed; and wherein said means responsive to said relay means comprises fuse means connecting said relay contacts and the operating circuitry to the power supply and operative to disconnect the operating circuitry from the power supply when current in the fuse exceeds a predetermined limit, said relay means being operative when closed to cause current through said fuse means to exceed said predetermined limit.

7. The power interrupter arrangement of claim 6 wherein said conductive pattern forms a serpentine pattern extending substantially over said outer layer.

8. A touch panel switch arrangement for appliances of the type including appliance operating circuitry energized by an external power supply and power interrupt circuitry operative to interrupt the supply of power to the operating circuitry from the power supply, said touch panel switch arrangement comprising:
- a touch panel array of switches including an inner circuit layer, an outer circuit layer and an insulated layer interposed between said circuit layers, said inner and outer circuit layers having formed thereon conductive switch members, and circuit patterns associated with said switch members; and
- a frangible serpentine conductive track pattern substantially covering at least one of said layers adapted for coupling to the power interrupt circuitry and effective to actuate the power interrupt circuitry upon the development of a discontinuity in said conductive track pattern whereby the supply of power to the appliance operating circuitry is interrupted in the event of a discontinuity in said track pattern resulting from physical damage to said touch panel array.

* * * * *